United States Patent
Asahara

(10) Patent No.: US 9,600,210 B2
(45) Date of Patent: Mar. 21, 2017

(54) SETTING VALUE MANAGEMENT APPARATUS AND MANAGEMENT METHOD THEREOF

(75) Inventor: Hideo Asahara, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/470,698

(22) Filed: May 14, 2012

(65) Prior Publication Data

US 2012/0311311 A1 Dec. 6, 2012

(30) Foreign Application Priority Data

May 31, 2011 (JP) ................................ 2011-122774

(51) Int. Cl.
G06F 15/173 (2006.01)
G06F 3/12 (2006.01)
H04L 12/24 (2006.01)
H04N 1/00 (2006.01)
H04N 1/32 (2006.01)

(52) U.S. Cl.
CPC .......... *G06F 3/1204* (2013.01); *G06F 3/1231* (2013.01); *G06F 3/1285* (2013.01); *H04L 41/0843* (2013.01); *H04N 1/00344* (2013.01); *H04N 1/00973* (2013.01); *H04N 1/32122* (2013.01); *H04N 2201/0039* (2013.01); *H04N 2201/0094* (2013.01); *H04N 2201/3204* (2013.01); *H04N 2201/3276* (2013.01)
USPC ...................................................... 709/224

(58) Field of Classification Search
USPC ................... 709/223–224; 358/1.13, 1.15
See application file for complete search history.

(56) References Cited

U.S. PATENT DOCUMENTS

| 6,243,747 B1* | 6/2001 | Lewis ................ H04L 41/0843 709/220 |
| 6,349,306 B1* | 2/2002 | Malik ................ H04L 41/0843 707/779 |
| 7,016,740 B2 | 3/2006 | Nakamura et al. |
| 7,047,088 B2 | 5/2006 | Nakamura et al. |
| 8,345,277 B2* | 1/2013 | Emori .................. G06F 3/1204 358/1.13 |
| 8,547,570 B2 | 10/2013 | Shigeeda |
| 8,612,574 B2 | 12/2013 | Akiyama et al. ............. 709/224 |
| 8,675,214 B2* | 3/2014 | Hagiwara .............. G06Q 10/06 358/1.13 |

(Continued)

FOREIGN PATENT DOCUMENTS

| CN | 1499350 A | 5/2004 |
| EP | 1191450 A1 | 3/2002 |

(Continued)

OTHER PUBLICATIONS

Dictionary.com, Definition of Manage, published Feb. 4, 2007.*

(Continued)

*Primary Examiner* — Joshua Joo
(74) *Attorney, Agent, or Firm* — Fitzpatrick, Cella, Harper & Scinto

(57) ABSTRACT

Virtual setting values for a specific image forming apparatus are generated using a model-dependent setting value schema which defines a schema of model-dependent setting values in each of a plurality of image forming apparatuses and tenant setting values required to commonly set setting values for the plurality of image forming apparatuses. The virtual setting values are held and managed.

11 Claims, 10 Drawing Sheets

(56) References Cited

U.S. PATENT DOCUMENTS

| | | | |
|---|---|---|---|
| 2002/0161740 A1 | 10/2002 | Nakamura et al. | |
| 2003/0225821 A1* | 12/2003 | Wanda | G06F 3/1203 709/201 |
| 2004/0039811 A1 | 2/2004 | Nakamura et al. | 709/223 |
| 2004/0153532 A1* | 8/2004 | Hosotani | H04L 41/0803 709/222 |
| 2005/0044200 A1* | 2/2005 | Aritomi | G06F 3/1204 709/223 |
| 2006/0043166 A1* | 3/2006 | Matsumoto | G06F 3/1222 235/376 |
| 2006/0095924 A1* | 5/2006 | Inoue | 719/327 |
| 2006/0238789 A1* | 10/2006 | Pesar | 358/1.13 |
| 2006/0256367 A1* | 11/2006 | Wei | H04N 1/00127 358/1.15 |
| 2007/0088814 A1* | 4/2007 | Torii | H04L 41/0273 709/223 |
| 2007/0171466 A1* | 7/2007 | Shigeeda | G06F 21/335 358/1.15 |
| 2008/0092144 A1 | 4/2008 | Nakazawa | |
| 2008/0100861 A1* | 5/2008 | Sakura | H04N 1/00204 358/1.15 |
| 2008/0123125 A1* | 5/2008 | Fukuda | H04N 1/00344 358/1.13 |
| 2008/0144086 A1 | 6/2008 | Shibao | 358/1.15 |
| 2008/0307416 A1* | 12/2008 | Inoue | H04L 41/0803 718/100 |
| 2009/0009805 A1* | 1/2009 | Yamade | B41J 11/0075 358/1.15 |
| 2009/0063718 A1* | 3/2009 | Sekine et al. | 710/8 |
| 2009/0066984 A1* | 3/2009 | Sugaya | H04L 41/0843 358/1.13 |
| 2009/0094604 A1* | 4/2009 | Sakai | 718/1 |
| 2009/0190150 A1* | 7/2009 | Selvaraj et al. | 358/1.15 |
| 2009/0201547 A1* | 8/2009 | Noguchi | H04L 12/66 358/1.15 |
| 2009/0235363 A1* | 9/2009 | Tomita | G06F 21/10 726/27 |
| 2009/0284784 A1* | 11/2009 | Morita | H04N 1/00233 358/1.15 |
| 2010/0064068 A1* | 3/2010 | Miyazawa | G03G 15/502 710/19 |
| 2010/0115148 A1* | 5/2010 | Nakai | H04N 1/32502 710/15 |
| 2010/0235436 A1* | 9/2010 | Ishizaki | H04N 7/173 709/203 |
| 2011/0058199 A1* | 3/2011 | Kobayashi | G06F 3/1205 358/1.9 |
| 2011/0096358 A1* | 4/2011 | Shibusawa | G06F 3/1219 358/1.15 |
| 2011/0116131 A1* | 5/2011 | Mitsui | 358/1.15 |
| 2011/0205558 A1* | 8/2011 | Nakajima | G06F 3/1291 358/1.2 |
| 2011/0231584 A1* | 9/2011 | Ishihara | H04L 12/12 710/16 |
| 2012/0117206 A1* | 5/2012 | Wu | H04L 41/0213 709/220 |
| 2012/0324210 A1 | 12/2012 | Shibao | 713/1 |
| 2014/0226184 A1* | 8/2014 | Nakajima | G06F 3/1291 358/1.15 |

FOREIGN PATENT DOCUMENTS

| | | |
|---|---|---|
| JP | 3743371 | 2/2006 |
| JP | 2007-130838 A | 5/2007 |
| JP | 2007-201638 A | 8/2007 |
| JP | 2009-177383 | 8/2009 |
| JP | 2010-081055 | 4/2010 |
| JP | 2010-113597 A | 5/2010 |

OTHER PUBLICATIONS

European Search Report, Application No. EP12168001 dated Jul. 22, 2013.
Chinese Office Action dated Sep. 2, 2014, issued in counterpart Chinese Application No. 201210176560.3, and English-language translation thereof.
Japanese Office Action, Application No. 2011-122774 dated Mar. 30, 2015.
Korean Office Action, Application No. 10-2012-0054256 dated Nov. 19, 2015.

* cited by examiner

FIG. 3
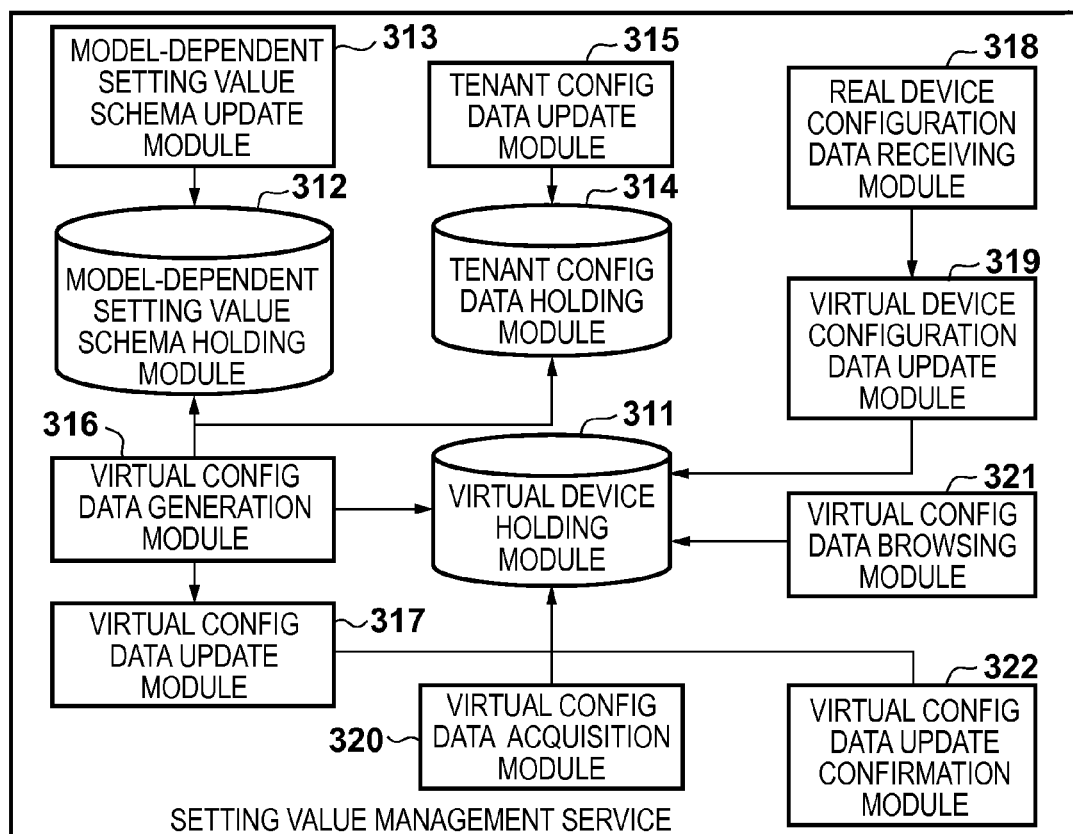
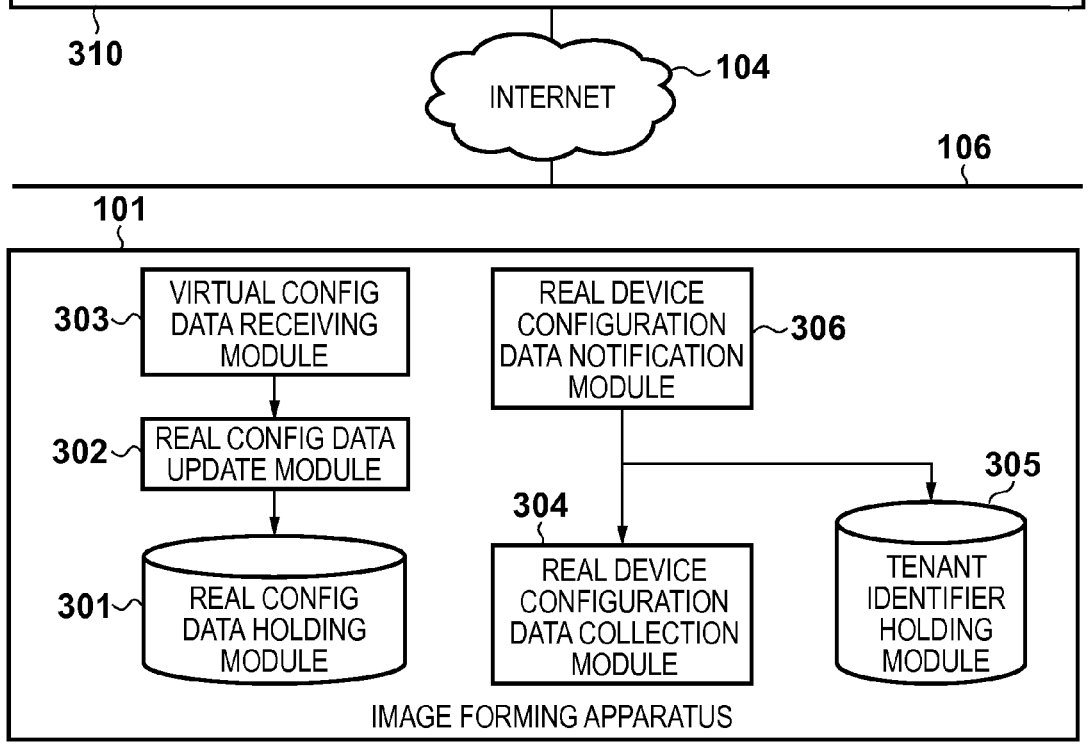

| SETTING VALUE IDENTIFIER | DEFAULT VALUE | VALUE RANGE | CONDITION |
|---|---|---|---|
| copy_settings.nup | 1 in 1 | 1 in 1, 2 in 1, 4 in 1 | NONE |
| device_settings.cloud_address | "http://oanon.com/config" | 256 BYTES | NONE |
| device_settings.sleep_time | 10 MIN | 1 MIN, 10 MIN, 1 HOUR | NONE |
| fax_settings.received_print | OFF | ON, OFF | FAX UNIT |
| box_settings.server_address | " " | 256 BYTES | NONE |

401B

| SETTING VALUE IDENTIFIER | DEFAULT VALUE | VALUE RANGE | CONDITION |
|---|---|---|---|
| copy_settings.nup | 1 in 1 | 1 in 1, 2 in 1, 4 in 1 | NONE |
| device_settings.cloud_address | "http://oanon.com/config" | 256 BYTES | NONE |
| device_settings.sleep_time | 10 SEC | 10 SEC, 1 MIN, 10 MIN, 1 HOUR | NONE |
| fax_settings.received_print | OFF | ON, OFF | FAX UNIT |

FIG. 5

| SETTING VALUE IDENTIFIER | VALUE |
|---|---|
| copy_settings.nup | 2 in 1 |
| device_settings.cloud_address | "http://oanon.com/config" |
| device_settings.sleep_time | 10 SEC |
| fax_settings.received_print | ON |
| box_settings.server_address | "http://192.168.1.1/server/" |

| 701A SETTING VALUE IDENTIFIER | 702 VALUE 703 |
|---|---|
| copy_settings.nup | 2 in 1 |
| device_settings.cloud_address | "http://oanon.com/config" |
| device_settings.sleep_time | 10 MIN |
| fax_settings.received_print | OFF |
| box_settings.server_address | "http://192.168.1.1/config" |

| 701B SETTING VALUE IDENTIFIER | 702 VALUE 703 |
|---|---|
| copy_settings.nup | 2 in 1 |
| device_settings.cloud_address | "http://oanon.com/config" |
| device_settings.sleep_time | 10 MIN |
| fax_settings.received_print | ON |
| box_settings.server_address | "http://192.168.1.1/server/" |

| 701C SETTING VALUE IDENTIFIER | 702 VALUE 703 |
|---|---|
| copy_settings.nup | 2 in 1 |
| device_settings.cloud_address | "http://oanon.com/config" |
| device_settings.sleep_time | 10 SEC |
| fax_settings.received_print | ON |

FIG. 8

| 801 | 802 | 803 | 804 | 805 | 806 |
|---|---|---|---|---|---|
| DEVICE IDENTIFIER | TENANT IDENTIFIER | VIRTUAL DEVICE CONFIGURATION DATA | VIRTUAL CONFIG DATA | NOTIFICATION FLAG |
| 010001 | 100 | 1 | 1 | NOT YET |
| 010002 | 100 | 2 | 2 | NOT YET |
| 020001 | 100 | 3 | 3 | DONE |
| 010010 | 200 | 4 | 4 | DONE |

SETTING VALUE MANAGEMENT APPARATUS AND MANAGEMENT METHOD THEREOF

BACKGROUND OF THE INVENTION

Field of the Invention

The present invention relates to a setting value management apparatus for simultaneously managing setting values (config data) required to switch operations of an image forming apparatus and a management method thereof.

Description of the Related Art

Conventionally, an image forming apparatus which stores setting values (config data) required to switch its operations is known. Since the config data are stored in a storage device included in each image forming apparatus, settings as many as the number of image forming apparatuses have to be made so as to change the config data of all the image forming apparatuses.

To save these steps, a technique for simultaneously setting config data of a plurality of image forming apparatuses from a given information processing apparatus is known. Also, a technique for allocating config data at a location where these data can be referred to via a network, and simultaneously managing the config data when a plurality of image forming apparatuses refer to the config data is available (Japanese Patent Laid-Open No. 2007-130838).

However, the above related art cannot be applied to config data, values of which are restricted under the influences of models of image forming apparatuses, hardware options included in the image forming apparatuses, and the like.

SUMMARY OF THE INVENTION

The present invention provides an apparatus and method, which can simultaneously manage setting values of all image forming apparatuses even when a plurality of image forming apparatuses include different models and different hardware options.

According to one aspect of the present invention, there is provided a setting value management apparatus for simultaneously managing setting values of a plurality of image forming apparatuses, comprising: a generation unit configured to generate virtual setting values for a specific image forming apparatus using a model-dependent setting value schema which defines a schema of model-dependent setting values in each of the plurality of image forming apparatuses and tenant setting values required to commonly set setting values for the plurality of image forming apparatuses; and a management unit configured to hold and manage the virtual setting values generated by the generation unit.

According to another aspect of the present invention, there is provided a management method of a setting value management apparatus for simultaneously managing setting values of a plurality of image forming apparatuses, the method comprising: generating virtual setting values for a specific image forming apparatus using a model-dependent setting value schema which defines a schema of model-dependent setting values in each of the plurality of image forming apparatuses and tenant setting values required to commonly set setting values for the plurality of image forming apparatuses; and holding and managing the virtual setting values generated in the generating step.

Further features of the present invention will become apparent from the following description of exemplary embodiments (with reference to the attached drawings).

BRIEF DESCRIPTION OF THE DRAWINGS

FIG. 3 is a block diagram showing an example of the software arrangements of a setting value management service and the image forming apparatus;

FIG. 4 includes tables showing examples of model-dependent setting value schemata;

FIG. 5 is a table showing an example of tenant config data;

FIG. 7 includes tables showing example of the configurations of a real config data holding unit;

FIG. 8 is a table showing an example of the configuration of a virtual device holding unit;

DESCRIPTION OF THE EMBODIMENTS

Figure 1:
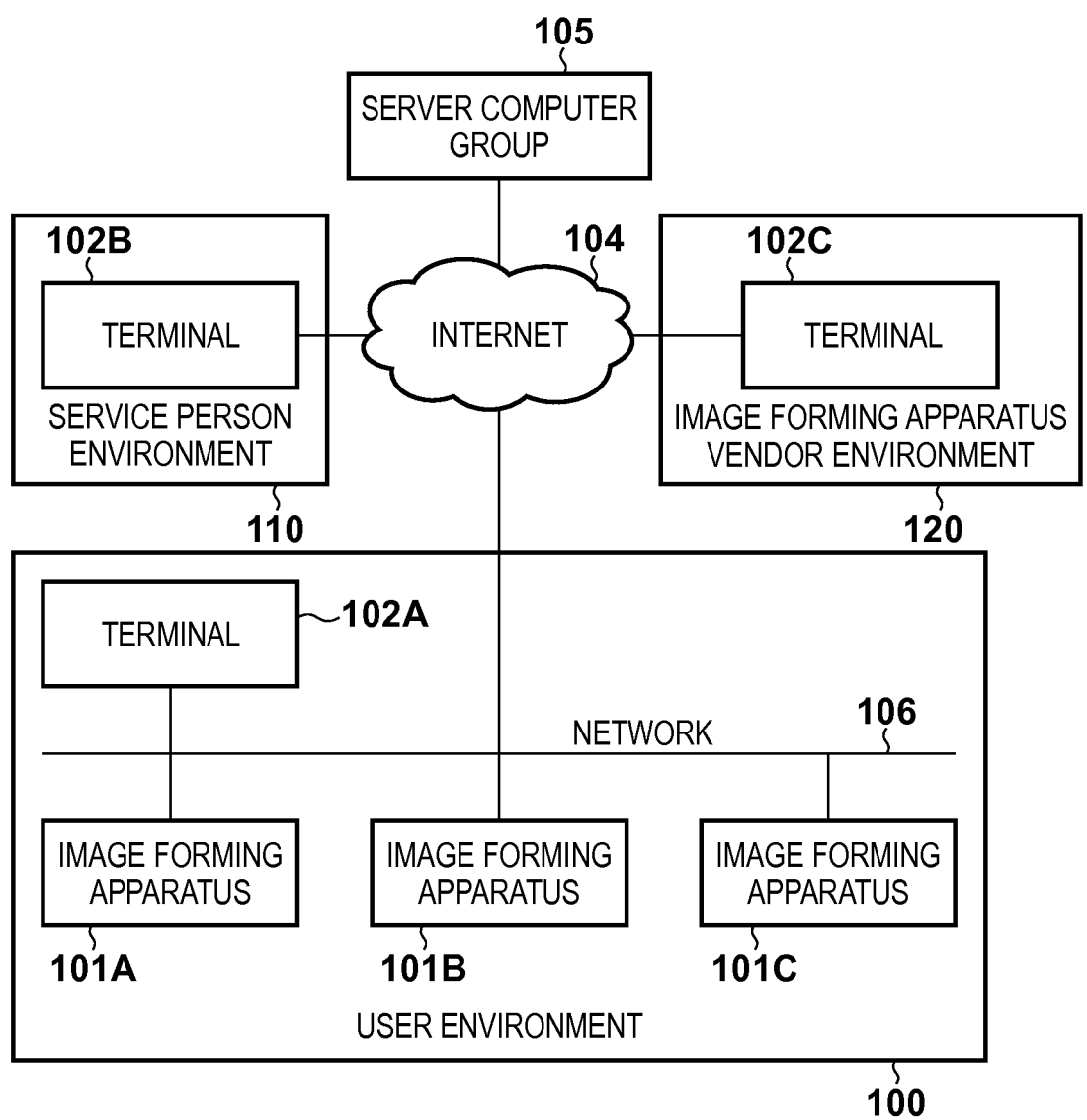
FIG. 1 is a block diagram showing an example of the network arrangement of a plurality of image forming apparatuses.

Embodiments of the present invention will be described in detail hereinafter with reference to the drawings.

Terms used in the following embodiments will be defined first. Setting values (config data) are data required to switch operations of an image forming apparatus. For example, each config data corresponds to an imposition default value of a copy job. When this value is set to be "1 in 1", one page is printed per sheet as a result of a copy operation. When this value is set to be "2 in 1", two pages are printed per sheet as a result of a copy operation.

Device configuration data is that which indicates the configuration of devices included in an image forming apparatus. For example, the device configuration data corresponds to data which represents whether or not a FAX unit is equipped. Furthermore, the device configuration data includes a model code used to uniquely identify a model of an image forming apparatus, a version of active firmware, and the like.

A model-dependent setting value schema is data which defines a schema of config data held by an image forming apparatus of a specific model. Note that the schema is data which defines agreements and positioning of config data. For example, the model-dependent setting value schema includes a setting value identifier, default value, value range, and condition required to validate data of each config data. Note that config data to be held have differences depending on models to be premised on management in which setting value schemata are prepared for respective models.

A virtual device is a data group of a real device held by a server computer group. More specifically, the virtual device includes at least device configuration data and config data.

A tenant is a unit of a consigner to whom the user consigns management of an image forming apparatus. A tenant identifier is an identifier used to uniquely identify a tenant. For example, assume that a certain company consigns management of three image forming apparatuses in a user environment to a tenant. In this case, one tenant identifier corresponding to the user environment is assigned, and the three image forming apparatuses are recognized as those which belong to that tenant and are simultaneously managed.

In this case, in order to distinguish data included in a virtual device, data held by a real device, and tenant-dedicated data from each other, the following definitions will be given. Device configuration data included in a virtual device will be referred to as virtual device configuration data, and setting values (config data) of the virtual device will be referred to as virtual setting values (virtual config data). Device configuration data held by a real device will be referred to as real device configuration data, and setting values (config data) of the real device will be referred to as real setting values (real config data). Setting values (config data) to be commonly used in a tenant will be referred to as tenant setting values (tenant config data). Note that terms will be explained as needed in addition to the above description.

An example of the network arrangement of a plurality of image forming apparatuses will be described below with reference to FIG. 1. Image forming apparatuses 101 (101A to 101C) are simultaneously managed by a setting value management service 310 (to be described in detail later), and can access an Internet 104 via a network 106.

A terminal 102A is a computer which can be operated by the user in a user environment 100, and can access the Internet 104 via the network 106. A terminal 102B is a computer which can be operated by a service person who manages the image forming apparatuses 101, and can access the Internet 104. Furthermore, a terminal 102C is a computer which can be operated by an administrator who belongs to a vendor of the image forming apparatuses 101, and can access the Internet 104. The Internet 104 is a computer network, is mutually connected using the Internet protocol technique.

A server computer group 105 is a server group, which provides a plurality of services via the Internet 104. The network 106 allows digital communications in the user environment 100. A service person environment 110 is an environment in which a service person manages the image forming apparatuses using the terminal 102B. An image forming apparatus vendor environment 120 is an environment in which the administrator of the vendor who manufactures image forming apparatuses maintains data required to manage the image forming apparatuses using the terminal 102C.

An example of the hardware arrangements of the image forming apparatus 101, terminal 102, and server computer group 105 will be described below with reference to FIG. 2. A CPU 211 of the image forming apparatus 101 executes programs, and controls various processes. A nonvolatile memory 212 includes a ROM, and stores programs, data, and the like, which are required in an initial stage in device activation processing. A volatile memory 213 includes a RAM, and is used as a temporary storage location of programs and data. An auxiliary storage device 214 that includes a large-capacity storage device such as a hard disk or RAM drive, saves large-capacity data, and holds execution codes of programs. The auxiliary storage device 214 stores data which are required to be held for a longer period of time than the volatile memory 213. The auxiliary storage device 214 is a nonvolatile storage device, and can keep storing data even after power-OFF.

A display 215 is a device which informs a user of information. Note that the user includes the user and service person. An input device 216 is a device which accepts a selection instruction from the user, and transfers the instruction to a program via an internal bus 210. A network communication device 217 is a device required to communicate with another information processing apparatus via a network. A FAX unit 218 is a hardware unit required to send image data formed by the image forming apparatus 101 or that stored in the auxiliary storage device to another information device via the network 106. The FAX unit 218 is an option, and may not be equipped depending on models.

A printer engine 219 has a function of printing, on a paper medium, image data formed by the image forming apparatus 101 or that stored in the auxiliary storage device. The internal bus 210 is a communication bus, which connects the CPU 211, nonvolatile memory 212, volatile memory 213, auxiliary storage device 214, display 215, input device 216, and network communication device 217 to be able to communicate with each other in the image forming apparatus 101.

The server computer group 105 includes a plurality of server computers 205 and 206 which are connected via a network 260. An internal bus 250 is a communication bus, which connects a CPU 251, nonvolatile memory 252, volatile memory 253, auxiliary storage device 254, and network communication device 257 included in the server computer 205 to be able to communicate with each other in the server computer 205. The network 260 is a network which allows high-speed communications between the server computers included in the server computer group 105.

Note that the hardware arrangement of the terminal 102 is that obtained by excluding the FAX unit 218 and printer engine 219 from that of the image forming apparatus 101, and a description thereof will not be given.

An example of the software arrangements of the setting value management service 310 which is executed by one server computer of the server computer group 105, and the image forming apparatus 101 will be described below with reference to FIG. 3.

The software arrangement of the image forming apparatus 101 will be described first. A real config data holding module 301 holds config data of the image forming apparatus 101 in the auxiliary storage device 214, and the image forming apparatus 101 switches operation behaviors based on the held real config data. A real config data update module 302 updates real config data held by the real config data holding module 301. The real config data are updated using virtual config data received by a virtual config data receiving module 303 (to be described later). The real config data are updated only under a condition that virtual config data have been updated by a virtual config data update confirmation module 322 (to be described later).

The virtual config data receiving module 303 calls a virtual config data acquisition module 320 (to be described later) to receive virtual config data. An address used to call the virtual config data acquisition module 320 uses that held in the real config data holding module 301. More specifically, taking virtual config data 701A shown in FIG. 7 as an example, an address "http://canon.com/config", a setting value identifier 702 of which assumes a value 703 "device_settings.cloud_address" is accessed.

Figure 6:
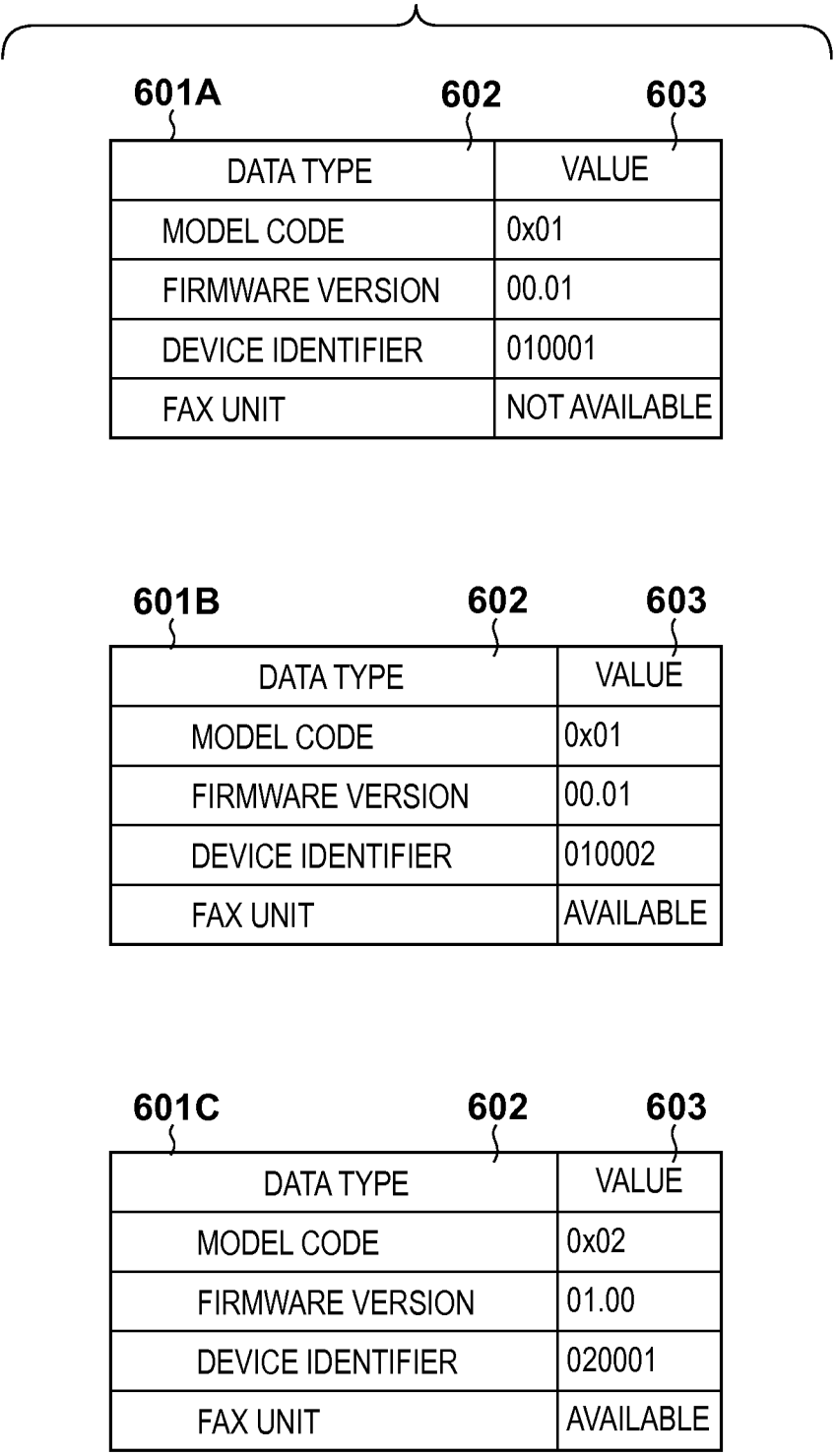
FIG. 6 includes tables showing examples of real device configuration data.

A real device configuration data collection module 304 collects device configuration data of the image forming apparatus 101. FIG. 6 shows an example of real device configuration data. Real device configuration data 601A to 601C are those of the image forming apparatuses 101A to 101C. Values 603 are respectively stored in data types 602. The data types 602 include a model code required to identify a model, a firmware version, a device identifier required to identify a device, and the presence/absence of a FAX unit.

A tenant identifier holding module 305 stores a tenant identifier to which the image forming apparatus 101 belongs. This tenant identifier is set at the time of initial installation of the image forming apparatus 101, and is stored in the auxiliary storage device 214 so as not to be lost even after power-OFF. A real device configuration data notification module 306 notifies the real device configuration data collected by the real device configuration data collection module 304 and the tenant identifier stored in the tenant identifier holding module 305. A notification destination is a real device configuration data receiving module 318 (to be described later).

Next, the software arrangement of the setting value management service 310 will be described below. The setting value management service 310 provides a function of simultaneously managing setting values (config data) of the plurality of image forming apparatuses 101A to 101C. This setting value management service 310 is provided on the aforementioned server computer group 105, and holds a plurality of modules. The respective modules will be described below.

A virtual device holding module 311 stores data held by virtual devices. FIG. 8 shows an example of virtual devices stored in the virtual device holding module 311. A virtual device list 801 corresponds to whole virtual devices held by the virtual device holding module 311.

A device identifier 802 is used to specify one of virtual devices in the virtual device list 801. The device identifier 802 is originally stored in the image forming apparatus 101, and allows to uniquely identify the image forming apparatus 101. This identifier is notified from the image forming apparatus 101 as one of device configuration data.

A tenant identifier 803 is used to identify a tenant to which the image forming apparatus 101 corresponding to a virtual device belongs. Virtual device configuration data 804 is device configuration data of the image forming apparatus 101 corresponding to a virtual device. As the virtual device configuration data, information shown in FIG. 6 is separately held by the virtual device holding module 311. The virtual device configuration data 804 holds an identifier used as a link to FIG. 6.

Virtual config data 805 is that to be referred to by the image forming apparatus 101 corresponding to a virtual device. As the virtual config data, information shown in FIG. 7 is separately held by the virtual device holding unit 311. The virtual config data 805 holds an identifier used as a link to FIG. 7.

A notification flag 806 indicates whether or not to send a notification to the image forming apparatus 101 after the virtual config data is updated. When a virtual config data acquisition module 320 refers to corresponding virtual config data, "done" is stored. When a virtual config data update module 317 updates corresponding virtual config data, "not yet" is stored.

A model-dependent setting value schema holding module 312 stores model-dependent setting value schemata. One model-dependent setting value schema is prepared in correspondence with each model of the image forming apparatus 101. FIG. 4 shows an example of model-dependent setting value schemata. Reference numeral 401A denotes an example of a model-dependent setting value schema with a model code=0x01. Reference numeral 401B denotes an example of a model-dependent setting value schema with a model code=0x02.

A setting value identifier 402 is used to uniquely identify a setting value. In this case, "copy_settings.nup" indicates a setting associated with imposition of copy settings. When this setting value identifier 402 is the same, it indicates a setting value of the same type even for different models.

A default value 403 is a definition of a default setting value in that model. A value range 404 is a definition of a range which can be set in that model.

The value range 404 of "copy_settings.nup" indicates that the user can select a value from three different values "1 in 1, 2 in 1, 4 in 1".

A condition 405 is a definition of a condition required to use the setting value in that model. Since the condition 405 of "fax_settings.received_print" includes "FAX unit", it indicates that this setting value is valid only when attachment of a FAX unit can be confirmed.

A model-dependent setting value schema update module 313 updates model-dependent setting value schemata held by the model-dependent setting value schema holding module 312. When an image forming apparatus vendor has announced a new model, a model-dependent setting value schema corresponding to the new model is registered in accordance with an instruction of an administrator of the vendor. When a setting value has changed, a model-dependent setting value schema is similarly updated.

A tenant config data holding module 314 holds config data to be set in the image forming apparatus 101 held by a tenant. FIG. 5 shows an example of tenant config data. A setting value identifier 502 is equivalent to the setting value identifier 402 in the model-dependent setting value schema described using FIG. 4. A value 503 is a common setting value desired by this tenant. "2 in 1" is set for "copy_settings.nup". This indicates that the tenant desires to set "2 in 1" in all the held image forming apparatuses.

A tenant config data update module 315 updates the tenant config data held by the tenant config data holding module 314. A service person who manages the image forming apparatuses held by the tenant updates the tenant config data. An update instruction is input from a setting screen displayed on a Web browser, which runs on the terminal 102B in the service person environment 110.

A virtual config data generation module 316 generates virtual config data using the model-dependent setting value schema, tenant config data, and virtual device configuration data. The processing contents of this module will be described below for respective steps.

The virtual config data generation module 316 acquires the virtual device configuration data from the virtual device holding module 311. The virtual config data generation module 316 refers to a model code included in the acquired virtual device configuration data to specify a model of the image forming apparatus. Taking virtual device configuration data 601A shown in FIG. 6 as an example, a model with a model code=0x01 is determined.

Next, the virtual config data generation module 316 acquires a model-dependent setting value schema which matches the acquired model code from the model-dependent setting value schema holding module 312. Taking a virtual device configuration data 601A as an example, a model-dependent setting value schema 401A which matches the model code=0x01 is acquired.

The virtual config data generation module 316 sets setting values defined in the model-dependent setting value schema as bases of virtual config data. Taking the model-dependent setting value schema 401A as an example, the following five setting values are set as bases:

"copy_settings.nup";
"device_settings.cloud_address";
"device_settings.sleep_time";
"fax_settings.received_print"; and
"box_settings.server_address".

The virtual config data generation module 316 then acquires values registered in the tenant config data, and determines whether or not the acquired values fall within value ranges defined in the model-dependent setting value schema. Taking the model-dependent setting value schema 401A and FIG. 5 as an example, "copy_settings.nup" has a value "2 in 1", and the value range is "1 in 1, 2 in 1, 4 in 1", the value falls within the value range. However, since "device_settings.sleep_time" has a value "10 sec", and a value range is "1 min, 10 min, 1 hour", that value does not fall within the value range. When the value does not fall within the value range, a default value defined in the model-dependent setting value schema is acquired. In this example, a default value "10 min" is acquired.

It is determined whether or not conditions defined in the model-dependent setting value schema are satisfied. This determination is made using the device configuration data. Taking the device configuration data 601A as an example, since a condition of "copy_settings.nup" is not particularly specified, it is satisfied. However, since a condition of "fax_settings.received_print" is "FAX unit", and the device configuration data is "not available", the condition is not satisfied. When the conditions are satisfied, values decided in steps described so far are used. On the other hand, when the condition is not satisfied, a default value 403 defined in the model-dependent setting value schema is acquired. In this example, "OFF" is acquired.

Values decided in the aforementioned steps correspond to virtual config data. FIG. 7 shows examples of the virtual config data, as denoted by reference numerals 701A to 701C. Reference numeral 701A denotes virtual config data corresponding to an image forming apparatus with a device identifier=010001. Also, reference numeral 701B denotes virtual config data corresponding to an image forming apparatus with a device identifier=010002. Furthermore, reference numeral 701C denotes virtual config data corresponding to an image forming apparatus with a device identifier=020001.

The virtual config data update module 317 registers the virtual config data generated by the virtual config data generation module 316 in the virtual device holding module 311. The virtual config data update module 317 searches virtual devices held by the virtual device holding module 311 for a virtual device whose device identifier matches, and updates the virtual config data. Furthermore, when the notification flag 806 of that virtual device is "done", the virtual config data update module 317 sets "not yet" in that flag. This indicates that the virtual config data has been changed, and the image forming apparatus has to refer to new virtual config data.

A real device configuration data receiving module 318 receives a notification from the real device configuration data notification module 306. Notified information includes the device configuration data shown in FIG. 6 and the tenant identifier. A virtual device configuration data update module 319 registers the device configuration data received by the real device configuration data receiving module 318 in a corresponding virtual device as virtual device configuration data. The virtual device configuration data update module 319 searches virtual devices held by the virtual device holding module 311 for a virtual device whose device identifier matches, and updates its virtual device configuration data.

A virtual config data acquisition module 320 receives a request from the image forming apparatus 101 via the Internet 104, and acquires virtual config data. In this case, the request includes at least a device identifier used to specify a virtual device, and the virtual config data acquisition module 320 searches for a virtual device whose device identifier matches. The virtual config data acquisition module 320 searches for virtual config data held by the found virtual device, and passes the virtual config data to a request source.

A virtual config data browsing module 321 receives a request via the Internet 104, and browses virtual config data. The request is that on an HTTP protocol, and virtual config data is browsed on an HTML page generated by the virtual config data browsing module 321.

A virtual config data update confirmation module 322 confirms whether or not virtual config data has been updated. The virtual config data receiving module 303 transmits a device identifier to the virtual config data update confirmation module 322 via the Internet 104. The virtual config data update confirmation module 322 searches virtual devices held by the virtual device holding module 311 for a virtual device which matches the received device identifier. If the notification flag 806 of the found virtual device is "not yet", the virtual config data update confirmation module 322 determines that the virtual config data has been updated. Conversely, if the notification flag 806 is "done", the module 322 determines that the virtual config data has not been updated.

Figure 9:
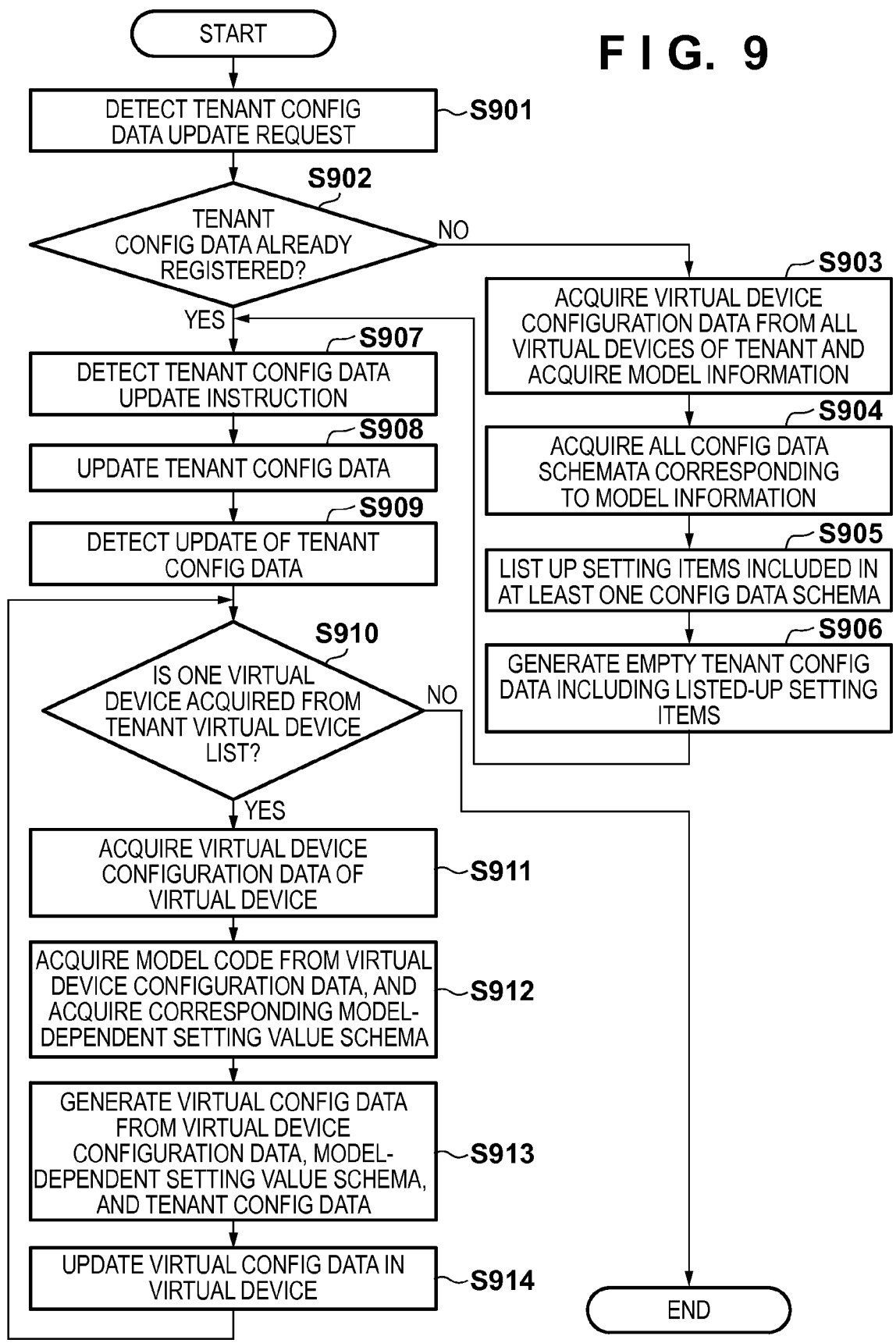
FIG. 9 is a flowchart showing update processing of tenant config data.

FIG. 9 is a flowchart for explaining processing for updating tenant config data by an administrator user using the terminal 102A. Respective modules which execute respective steps of the flowchart are stored in any storage unit of the nonvolatile memory 252, volatile memory 253, and auxiliary storage device 254, and are executed by the CPU 251.

In step S901, the tenant config data update module 315 detects an update request of tenant config data. The tenant config data update module 315 confirms in step S902 whether or not the tenant config data holding module 314 stores tenant config data corresponding to the update request in step S901. If that tenant config data is stored, the tenant config data update module 315 executes step S907; otherwise, it executes step S903.

In step S903, the tenant config data update module 315 searches the virtual device holding module 311 for a virtual device held by the tenant. In step S904, the tenant config data update module 315 refers to a model code included in virtual device configuration data of the virtual device found in step S903. Furthermore, the tenant config data update module 315 searches the model-dependent setting value schema holding module 312 for model-dependent setting value schemata which match the model code.

In step S905, the tenant config data update module 315 lists up settings included in at least one of the model-dependent setting value schemata found in step S904. In step S906, the tenant config data update module 315 generates tenant config data having the settings listed up in step S905.

In step S907, the tenant config data update module 315 detects a practical update instruction of the tenant config data. In step S908, the tenant config data update module 315 updates the tenant config data held by the tenant config data holding module 314 based on the update instruction detected in step S907. Then, in step S909, the virtual config data generation module 316 detects update of the tenant config data.

In step S910, the virtual config data generation module 316 searches virtual devices held by the virtual device holding module 311 for virtual devices which match a tenant identifier of the tenant config data whose update is detected. In order to execute sequential processing for the found virtual devices, the virtual config data generation module 316 acquires one virtual device. After the virtual device is acquired, the virtual config data generation module 316 executes step S911. The sequential processing is executed for all virtual devices, and when a next virtual device cannot be acquired, the processing ends.

In step S911, the virtual config data generation module 316 acquires virtual device configuration data from the virtual device. In step S912, the virtual config data generation module 316 acquires a model code from the virtual device configuration data. Furthermore, the virtual config data generation module 316 searches model-dependent setting value schemata held by the model-dependent setting value schema holding module 312 for a model-dependent setting value schema corresponding to the model code.

In step S913, the virtual config data generation module 316 generates virtual config data using the virtual device configuration data, model-dependent setting value schema, and tenant config data. In step S914, the virtual config data update module 317 registers the virtual config data generated in step S913 in the virtual device.

Figure 10:
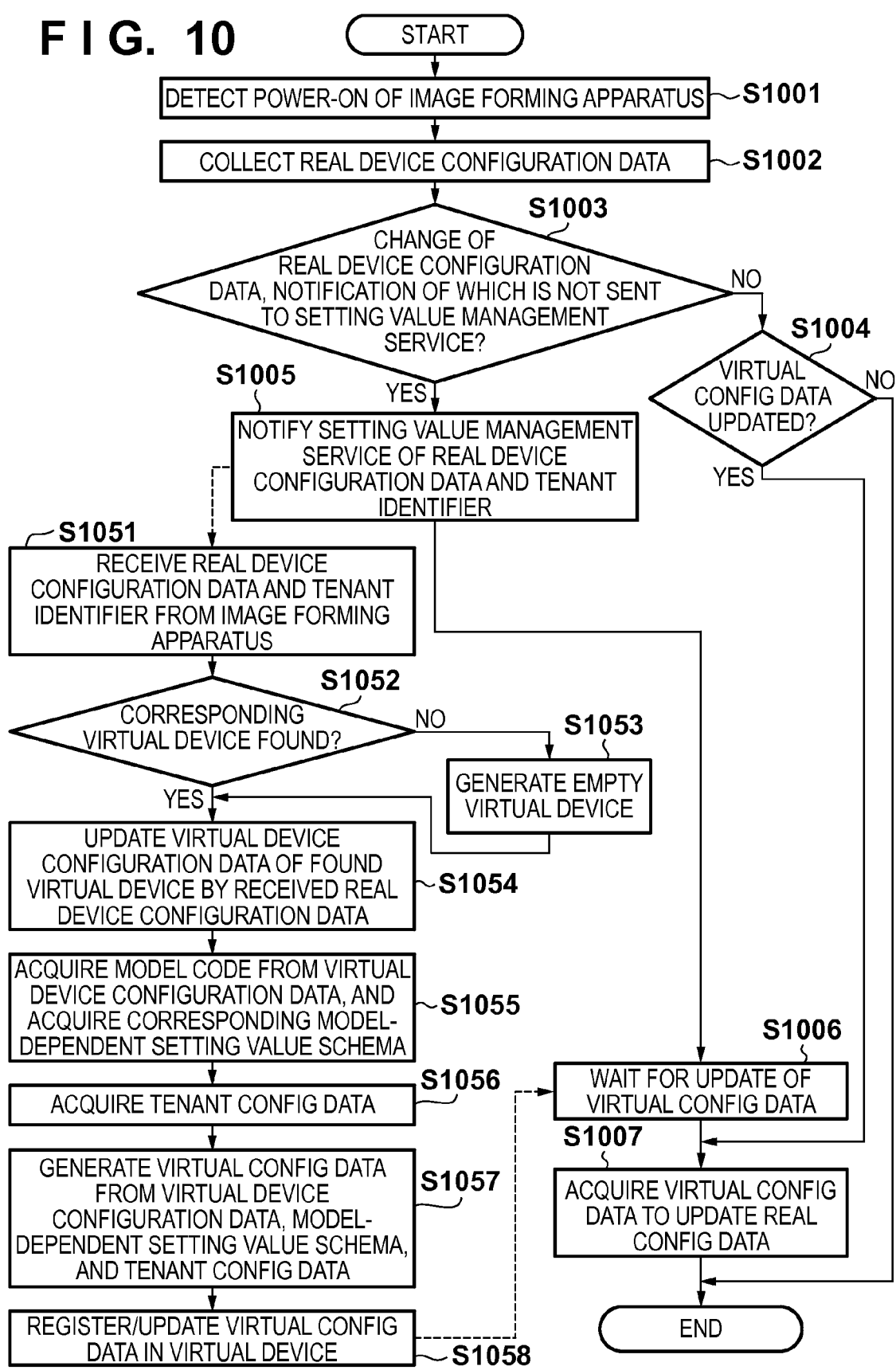
FIG. 10 is a flowchart showing acquisition processing of virtual config data.

FIG. 10 is a flowchart for explaining processing for acquiring virtual config data from the image forming apparatus. Steps S1001 to S1008 are those executed by the image forming apparatus. Respective modules which execute these steps are stored in any storage unit of the nonvolatile memory 212, volatile memory 213, and auxiliary storage device 214, and are executed by the CPU 211.

Steps S1051 to S1058 are those to be executed by the server computer group 105. Respective modules which execute these steps are stored in any storage unit of the nonvolatile memory 252, volatile memory 253, and auxiliary storage device 254, and are executed by the CPU 251.

In step S1001, the real device configuration data notification module 306 detects power-ON of the image forming apparatus. In step S1002, the real device configuration collection module 304 collects device configuration data. The real device configuration data notification module 306 determines in step S1003, using the real device configuration data collected in step S1002, whether or not there is a change of real configuration data, a notification of which is not sent to the setting value management service 310. If such change is found, step S1005 is executed; otherwise, step S1004 is executed.

The virtual config data receiving module 303 determines in step S1004 whether or not a device has already acquired the latest virtual config data. The virtual config data receiving module 303 calls the virtual config data update confirmation module 322 to attain this determination step. In step S1005, the real device configuration data notification module 306 notifies the setting value management service 310 of the real device configuration data and tenant identifier. The setting value management service 310 side detects this in step S1051, and executes processing. Details of this processing will be described later.

In step S1006, the virtual config data receiving module 303 waits execution of processing until the update processing of virtual config data is complete. In step S1007, the virtual config data receiving module 303 receives the virtual config data from the setting value management service 310. Furthermore, the real config data update module 302 updates the received virtual config data as real config data. The real config data is stored by the real config data holding module 301.

In step S1051, the real device configuration data receiving module 318 receives the real device configuration data and tenant identifier notified from the image forming apparatus. In step S1052, the virtual device configuration data update module 319 searches for a virtual device which matches the real device configuration data and tenant identifier received in step S1051. In this case, the module 319 searches virtual devices held by the virtual device holding module 311. In a case in which the image forming apparatus communicates with the setting value management service 310 for the first time, a virtual device search may often fail. If a virtual device which matches the real device configuration data and tenant identifier is found, step S1054 is executed. If a virtual device which matches the real device configuration data and tenant identifier is not found, step S1053 is executed.

In step S1053, the virtual device configuration data update module 319 generates an empty virtual device. In step S1054, the virtual device configuration data update module 319 updates virtual device configuration data of the virtual device which is found in step S1052 or is generated in step S1053. The contents of the real device configuration data received in step S1051 correspond to new virtual device configuration data.

In step S1055, the virtual config data generation module 316 acquires a model code from the updated virtual device configuration data. Furthermore, the virtual config data generation module 316 acquires a model-dependent setting value schema corresponding to the model code from the model-dependent setting value schema holding module 312. In step S1056, the virtual config data generation module 316 acquires tenant config data. The module 316 searches tenant config data held by the tenant config data holding module 314 for tenant config data which matches the tenant identifier.

In step S1057, the virtual config data generation module 316 generates virtual config data. The virtual config data generation module 316 generates the virtual config data using the virtual device configuration data, model-dependent setting value schema, and tenant config data. In step S1058, the virtual config data update module 317 registers the virtual config data generated in step S1057 in the corresponding virtual device. The description of this embodiment has been made.

A modification of the embodiment according to the present invention will be described below. In the network shown in FIG. 1, assume that the setting value management service 310 is executed by any of server computers in the server computer group 105. However, another arrangement may be adopted. For example, the server computer group may include only one server computer 205. Alternatively, the server computer group may be included in the user environment 100, service person environment 110, image forming apparatus vendor environment 120, or the like.

In the network block diagram shown in FIG. 1, assume that the service person uses the terminal 102B placed in the service person environment 110. However, another arrangement may be adopted. For example, the service person may use the terminal 102A placed in the user environment 100 under the user's permission.

Figure 2:
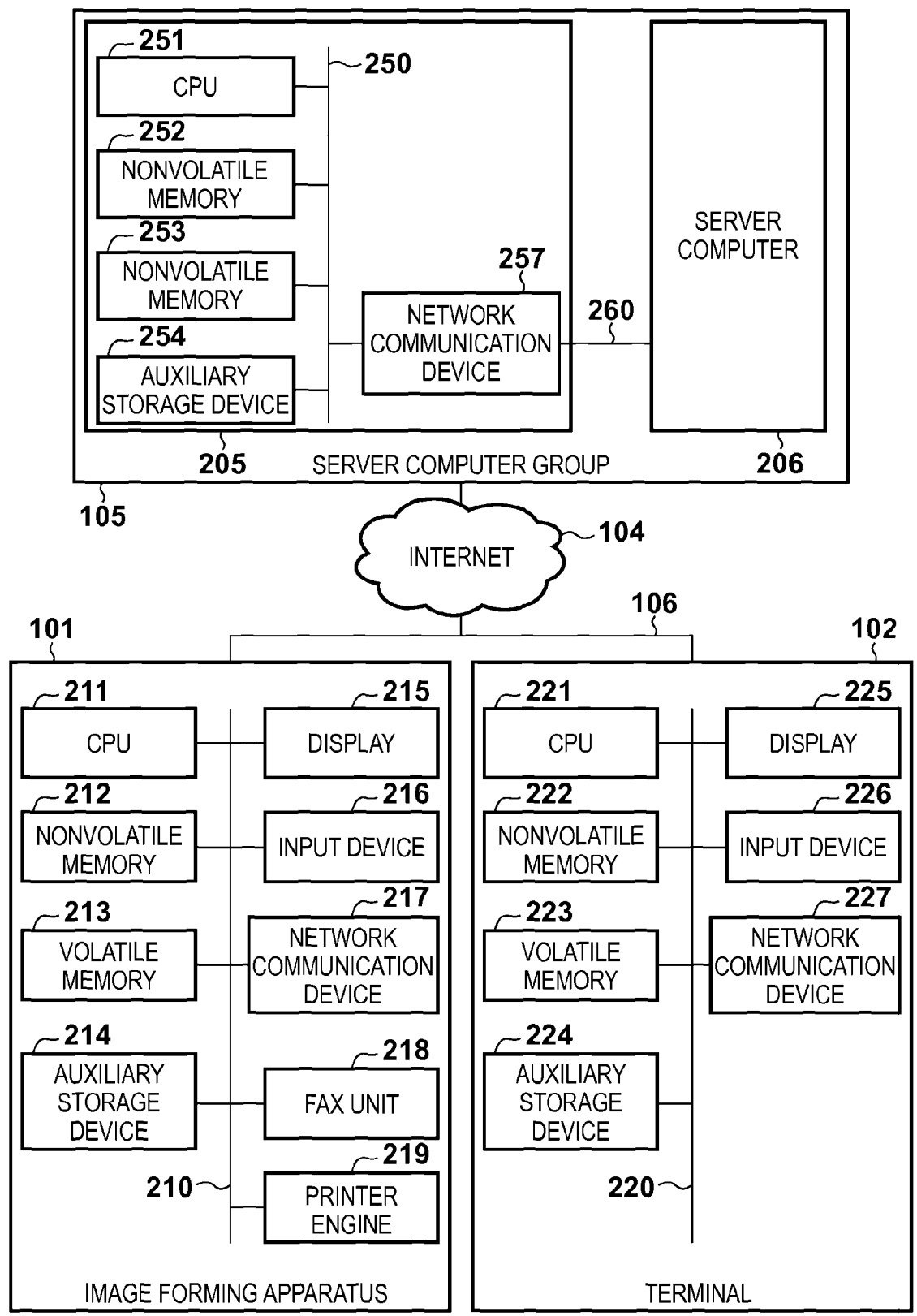
FIG. 2 is a block diagram showing an example of the hardware arrangements of respective apparatuses shown in FIG. 1.

In the hardware block diagram shown in FIG. 2, the server computer 205 and 206 communicate with each other via the network 260. However, another arrangement may be adopted. For example, these server computers may communicate with each other via the Internet 104.

In the software block diagram shown in FIG. 3, the real config data holding module 301 stores real config data in the auxiliary storage device 214. However, another arrangement may be adopted. For example, the volatile memory 213 may temporarily store the real config data. In this case, since the real config data are lost after power-OFF, the virtual config data receiving module 303 has to receive virtual config data every time the power supply of the device is turned on. In the practical processing sequence, the virtual config data update determination processing need not be executed in step S1004 in FIG. 10, and step S1007 is always executed.

In the software block diagram shown in FIG. 3, the real device configuration data collection module 304 collects real device configuration data every time the power supply of the image forming apparatus is turned on. However, another arrangement may be adopted. For example, a real device configuration data holding module may be included, and may always store real device configuration data in the auxiliary storage device 214. In this case, an arrangement for quickly rewriting real device configuration data held by the real device configuration data holding module in response to a change in real device configuration data is required. For this purpose, the real device configuration data collection module 304 has to monitor a change in real device configuration data, and update change contents in the real device configuration data holding module upon detection of the change contents. Furthermore, the real device configuration data notification module 306 requests the real device configuration data holding module to send real device configuration data.

In the software block diagram shown in FIG. 3, the tenant identifier holding module 305 stores tenant identifiers in the auxiliary storage device 214. However, another arrangement may be adopted. For example, the user may input the tenant identifier using the input device 216. The input timing may be an activation timing of the image forming apparatus or another timing. In this case, the tenant identifier is stored in the volatile memory 213.

In the software block diagram shown in FIG. 3, the real device configuration data notification module 306 executes processing by detecting power-ON of the image forming apparatus. However, another arrangement may be adopted. For example, the user may instruct to acquire virtual config data using the input device 216. In this case, by detecting a virtual config data acquisition instruction in step S1001 in FIG. 10, step S1002 and subsequent steps are executed.

In the software block diagram shown in FIG. 3, the virtual device holding module 311 holds virtual device configuration data and identifiers used to identify virtual config data, as shown in FIG. 8. However, another arrangement may be adopted. For example, data entities may be held in place of the identifiers.

In the software block diagram shown in FIG. 3, the virtual config data generation module 316 generates virtual config data from the model-dependent setting value schema, tenant config data, and virtual device configuration data. However, another arrangement may be adopted. For example, virtual config data which fits a model may be generated from two data, that is, the model-dependent setting value schema and tenant config data. In this case, the image forming apparatus refers to the real config data in correspondence with its device configuration.

As another example, virtual config data may be generated further using license data. In this case, the virtual config data is generated in correspondence with option functions included in the image forming apparatus.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-122774, filed May 31, 2011 which is hereby incorporated by reference herein in its entirety.

What is claimed is:

1. A setting value management apparatus, comprising:
a memory storing a program; and
a processor connected to the memory, and when performing the program the processor is:
configured to receive, from an image forming apparatus, device configuration information indicating a device configuration of the image forming apparatus, wherein the device configuration information includes at least model information in accordance with a model thereof and option information in accordance with whether the model of the image forming apparatus includes a unit which is an option;
configured to store a plurality of model-dependent setting value schema for different models;
configured to select a model-dependent setting value schema matching the model information of the image forming apparatus, the selected model-dependent setting value schema including a setting value that is valid when the option information, received from the image forming apparatus as part of the configuration information, indicates that the model of the image forming apparatus includes the unit which is an option;
configured to generate setting values for the image forming apparatus based on the selected model-dependent setting value schema, using the received model information in accordance with the model thereof, and the received option information in accordance with whether the model of the image forming apparatus includes a unit which is an option;
configured to hold and manage the generated setting values for the image forming apparatus; and
configured to transmit, to the image forming apparatus, the setting values for the image forming apparatus managed by the processor,
wherein the setting values for an image forming apparatus are managed for each image forming apparatus by the processor.

2. The apparatus according to claim 1, wherein the processor is configured to generate the setting values using license data indicating information associated with an option function included in the image forming apparatus.

3. The apparatus according to claim 1, wherein the processor generates setting values for an image forming apparatus for each image forming apparatus.

4. The apparatus according to claim 1, wherein the processor is configured to generate the setting values using a device-dependent setting value schema which defines a schema of device-dependent setting values in each of a plurality of image forming apparatuses and common setting values required to commonly set setting values for the plurality of image forming apparatuses.

5. The apparatus according to claim 4, wherein the processor is further:
- configured to obtain a change instruction of the common setting values; and
- configured to change the common setting values managed by the processor based on the obtained change instruction, and change, using the changed common setting values, setting values of an image forming apparatus managed by the processor.

6. A management method of a setting value management apparatus, the method comprising:
- receiving, from an image forming apparatus, device configuration information indicating a device configuration of the image forming apparatus, wherein the device configuration information includes at least model information in accordance with a model thereof and option information in accordance with whether the model of the image forming apparatus includes a unit which is an option;
- storing a plurality of model-dependent setting value schema for different models; information in accordance with whether the model of the image forming apparatus includes a unit which is an option;
- storing a plurality of model-dependent setting value schema for different models;
- selecting a model-dependent setting value schema matching the model information of the image forming apparatus, the selected model-dependent setting value schema including a setting value that is valid when the option information, received from the image forming apparatus as part of the configuration information, indicates that the model of the image forming apparatus includes the unit which is an option;
- generating setting values for the image forming apparatus based on the selected model-dependent setting value schema, using the received model information in accordance with the model thereof and the received option information in accordance with whether the model of the image forming apparatus includes a unit which is an option;
- holding and managing the setting values for the image forming apparatus generated in the generating step; and
- transmitting, to the image forming apparatus, setting values for the image forming apparatus managed in the managing step,
- wherein in the managing step, setting values for an image forming apparatus are managed for each image forming apparatus.

7. The method according to claim 6, wherein in the generating step, the setting values are generated using license data indicating information associated with an optional function included in the image forming apparatus.

8. The method according to claim 6, wherein in the generating step, setting values for an image forming apparatus are generated for each image forming apparatus.

9. The method according to claim 6, wherein in the generating step, the setting values are generated using a device-dependent setting value schema which defines a schema of device-dependent setting values in each of a plurality of image forming apparatuses and common setting values required to commonly set setting values for the plurality of image forming apparatuses.

10. The method according to claim 9, further comprising:
- obtaining a change instruction of the common setting values; and
- changing the common setting values managed in the managing step based on the obtained change instruction, and changing, using the changed common setting values, setting values of an image forming apparatus managed in the managing step.

11. A non-transitory computer-readable recording medium recording a program for causing a computer to execute a management method of a setting value management apparatus, the management method comprising:
- receiving, from an image forming apparatus, device configuration information indicating a device configuration of the image forming apparatus, wherein the device configuration information includes at least model information in accordance with a model thereof and option information in accordance with whether the model of the image forming apparatus includes a unit which is an option;
- storing a plurality of model-dependent setting value schema for different models;
- selecting a model-dependent setting value schema matching the model information of the image forming apparatus, the selected model-dependent setting value schema including a setting value that is valid when the option information, received from the image forming apparatus as part of the configuration information, indicates that the model of the image forming apparatus includes the unit which is an option;
- generating setting values for the image forming apparatus based on the selected model-dependent setting value schema, using the received model information in accordance with the model thereof and the received option information in accordance with whether the model of the image forming apparatus includes a unit which is an option;
- holding and managing the setting values for the image forming apparatus generated in the generating step; and
- transmitting, to the image forming apparatus, setting values for the image forming apparatus managed in the managing step,
- wherein in the managing step, setting values for an image forming apparatus are managed for each image forming apparatus.

* * * * *